(12) United States Patent
Liang et al.

(10) Patent No.: US 11,177,095 B2
(45) Date of Patent: Nov. 16, 2021

(54) WALL GRAZER APPARATUS

(71) Applicant: XIAMEN ECO LIGHTING CO. LTD., Xiamen (CN)

(72) Inventors: Jinhui Liang, Xiamen (CN); Yongzhe Dong, Xiamen (CN); Xiaoliang Wen, Xiamen (CN); Shouqiang Hou, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/852,473

(22) Filed: Apr. 18, 2020

(65) Prior Publication Data

US 2020/0363044 A1 Nov. 19, 2020

(30) Foreign Application Priority Data

May 13, 2019 (CN) .......................... 201920679747.2

(51) Int. Cl.

| | |
|---|---|
| *H01H 23/16* | (2006.01) |
| *H05B 47/19* | (2020.01) |
| *H05B 39/04* | (2006.01) |
| *F21V 23/04* | (2006.01) |
| *F21V 29/70* | (2015.01) |
| *F21V 29/89* | (2015.01) |
| *F21V 14/06* | (2006.01) |
| *F21V 21/30* | (2006.01) |
| *F21V 23/00* | (2015.01) |

(Continued)

(52) U.S. Cl.
CPC .............. *H01H 23/16* (2013.01); *F21V 14/06* (2013.01); *F21V 21/30* (2013.01); *F21V 23/003* (2013.01); *F21V 23/04* (2013.01); *F21V 23/0464* (2013.01); *F21V 29/70* (2015.01); *F21V 29/73* (2015.01); *F21V 29/89* (2015.01); *H01H 9/02* (2013.01); *H02G 3/08* (2013.01); *H05B 39/04* (2013.01); *H05B 47/19* (2020.01); *F21Y 2115/10* (2016.08)

(58) Field of Classification Search
CPC ......... H01H 23/16; F21V 29/70; F21V 29/73; F21V 29/89; F21V 21/02; F21V 21/30; F21V 23/003; F21V 23/04; F21S 8/032
See application file for complete search history.

(56) References Cited

U.S. PATENT DOCUMENTS

| | | | |
|---|---|---|---|
| 2007/0098334 A1* | 5/2007 | Chen ...................... | F21V 19/004 385/92 |
| 2009/0141494 A1* | 6/2009 | Zhang ...................... | F21V 29/74 362/249.03 |

(Continued)

*Primary Examiner* — Alan B Cariaso
(74) *Attorney, Agent, or Firm* — Chun-Ming Shih; Lanway IPR Services

(57) ABSTRACT

A wall grazer apparatus is provided. The wall grazer apparatus has a heat sink platform, a light source, a lens, a driver and a main housing. The heat sink platform has a main portion and a tilt portion. The light source is mounted on the tilt portion. The lens is disposed above the light source to convert an original light emitted from the light source to an output light. The driver converts an external power to a driving current. The driving current is supplied to the light source. The main housing disposes the heat sink platform, the light source, the lens and the driver. When the main housing is fixed to a first surface, the output light is projected on a second surface for forming a visual effect.

19 Claims, 14 Drawing Sheets

(51) Int. Cl.
*F21V 29/73* (2015.01)
*F21Y 115/10* (2016.01)
*H02G 3/08* (2006.01)
*H01H 9/02* (2006.01)

(56) References Cited

U.S. PATENT DOCUMENTS

| | | | |
|---|---|---|---|
| 2010/0188849 A1* | 7/2010 | Luo | F21K 9/00 362/249.02 |
| 2013/0201665 A1* | 8/2013 | Roos | F21V 33/006 362/145 |
| 2013/0201674 A1* | 8/2013 | Pickard | F21V 21/03 362/218 |
| 2016/0245486 A1* | 8/2016 | Freier | F21S 2/005 |
| 2016/0305641 A1* | 10/2016 | Lin | F21S 8/04 |

* cited by examiner

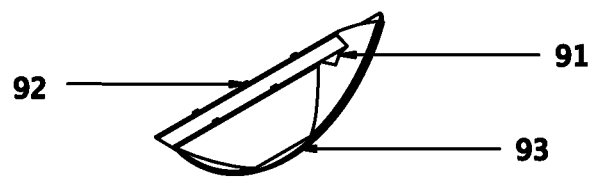
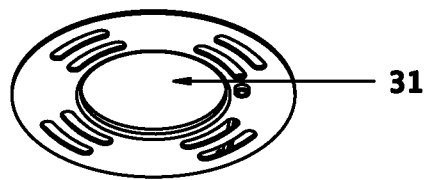
Fig. 4
Fig. 5
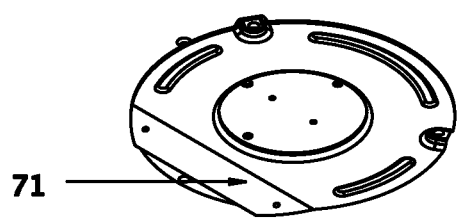
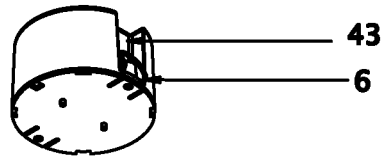
Fig. 6
Fig. 7

WALL GRAZER APPARATUS

FIELD

The present application is related to a wall grazer apparatus and more particularly related to an LED wall grazer apparatus.

BACKGROUND

Electroluminescence, an optical and electrical phenomenon, was discover in 1907. Electroluminescence refers the process when a material emits light when a passage of an electric field or current occurs. LED stands for light-emitting diode. The very first LED was reported being created in 1927 by a Russian inventor. During decades' development, the first practical LED was found in 1961, and was issued patent by the U.S. patent office in 1962. In the second half of 1962, the first commercial LED product emitting low-intensity infrared light was introduced. The first visible-spectrum LED, which limited to red, was then developed in 1962.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

With high light output, LEDs are available across the visible, infrared wavelengths, and ultraviolet lighting fixtures. Recently, there is a high-output white light LED. And this kind of high-output white light LEDs are suitable for room and outdoor area lighting. Having led to new displays and sensors, LEDs are now be used in advertising, traffic signals, medical devices, camera flashes, lighted wallpaper, aviation lighting, horticultural grow lights, and automotive headlamps. Also, they are used in cellphones to show messages.

A Fluorescent lamp refers to a gas-discharge lamps. The invention of fluorescent lamps, which are also called fluorescent tubes, can be traced back to hundreds of years ago. Being invented by Thomas Edison in 1896, fluorescent lamps used calcium tungstate as the substance to fluoresce then. In 1939, they were firstly introduced to the market as commercial products with variety of types.

In a fluorescent lamp tube, there is a mix of mercury vapor, xenon, argon, and neon, or krypton. A fluorescent coating coats on the inner wall of the lamp. The fluorescent coating is made of blends of rare-earth phosphor and metallic salts. Normally, the electrodes of the lamp comprise coiled tungsten. The electrodes are also coated with strontium, calcium oxides and barium. An internal opaque reflector can be found in some fluorescent lamps. Normally, the shape of the light tubes is straight. Sometimes, the light tubes are made circle for special usages. Also, u-shaped tubes are seen to provide light for more compact areas.

Because there is mercury in fluorescent lamps, it is likely that the mercury contaminates the environment after the lamps are broken. Electromagnetic ballasts in fluorescent lamps are capable of producing buzzing mouse. Radio frequency interference is likely to be made by old fluorescent lamps. The operation of fluorescent lamps requires specific temperature, which is best around room temperature. If the lamps are placed in places with too low or high temperature, the efficacy of the lamps decreases.

In real lighting device design, details are critical no matter how small they appear. For example, to fix two components together conveniently usually brings large technical effect in the field of light device particularly when any such design involves a very large number of products to be sold around the world.

SUMMARY

A wall grazer apparatus is provided. The wall grazer apparatus has a heat sink platform, a light source, a lens, a driver and a main housing. The heat sink platform has a main portion and a tilt portion. The light source is mounted on the tilt portion. The lens is disposed above the light source to convert an original light emitted from the light source to an output light. The driver converts an external power to a driving current. The driving current is supplied to the light source. The main housing disposes the heat sink platform, the light source, the lens and the driver. When the main housing is fixed to a first surface, the output light is projected on a second surface for forming a visual effect.

In some embodiments, the heat sink platform is a metal plate with a bent portion as a tilt portion. The main portion is parallel to the first surface.

In some embodiments, the tilt portion is manually rotatable with respect to the main portion of the heat sink platform.

In some embodiments, the light source and the lens are formed as a first module. The heat sink platform and the driver are formed as a second module. The first module is detachably connected to the second module for replacing a different first module with different parameters.

In some embodiments, the first module has a module housing with a tilt block for changing an angle between a light source and a second surface when the first module is attached to the heat sink platform.

In some embodiments, the wall grazer apparatus has an interface. The interface is capable of being plugged in an attached device.

In some embodiments, the main housing has a manual switch. The manual switch connects to the driver for changing a control setting of the light source.

In some embodiments, the driver is connected to a color temperature sensor. The color temperature sensor is capable of capturing an environment color to let the driver adjust colors of light emitted In some embodiments, the driver controls the light source to generate a variation of light based on a stored script.

In some embodiments, the driver is connected to a wind sensor to control the light emitted to create a flowing effect.

In some embodiments, the driver controls a switch of the light source by co-working with another neighboring wall grazer apparatus to cool down periodically.

In some embodiments, a memory card is detachably connected to the driver for providing a schema. The driver is capable of controlling the light source by the schema.

In some embodiments, the driver shares the schema to another wall grazer apparatus.

In some embodiments, the driver has a server. The server is capable of providing wireless access to another wall grazer apparatus for sharing control data.

In some embodiments, the driver synchronizes with another wall grazer apparatus to show a light effect.

In some embodiments, the driver controls the light source to emit a response light when a mobile device sends a calling message.

In some embodiments, the wall grazer apparatus has a distance switch. The distance switch is capable of adjusting a distance between the light source and the lens.

In some embodiments, the wall grazer apparatus has a rotation switch. The rotation switch is capable of adjusting an angle between the light source and the lens.

In some embodiments, the light source has multiple sets of LED modules. Each set of the LED modules corresponds to a different lens set for producing a different light pattern.

In some embodiments, the multiple sets of LED modules are operable independently to mix a desired effect.

In some embodiments, the heat sink platform is a metal plate with a bent portion as the tilt portion, the main portion is parallel to the first surface.

In some embodiments, the tilt portion is manually rotatable with respect to the main portion of the heat sink platform.

In some embodiments, the light source and the lens form a first module, the heat sink platform and the driver are formed as a second module, the first module is detachably connected to the second module for replacing a different first module with different parameters.

In some embodiments, the first module has a module housing with a tilt block for changing a final tilt angle of the light source with respect to the second surface when the first module is attached to the heat sink platform.

In some embodiments, the wall grazer apparatus may also include an interface for plugging an attached device.

In some embodiments, the main housing has a manual switch connected to the driver for changing a control setting of the light source.

In some embodiments, the driver is connected to a color temperature sensor for capturing an environment color temperature to adjust colors of the output light of the light source.

In some embodiments, the driver controls the light source to generate a variation of the output light over time based on a stored script.

In some embodiments, the driver is connected to a wind sensor for controlling the output light to create a flowing effect according to a detected wind.

In some embodiments, the driver controls the light source to start and stop the light source emitting the output light by co-working with another neighboring wall grazer apparatus to cool down periodically.

In some embodiments, a memory card is detachably connected to the driver for providing a schema for controlling the light source.

In some embodiments, the driver shares data of the scheme to another wall grazer apparatus.

In some embodiments, the driver contains a server for providing wireless access to another wall grazer apparatus for sharing control data.

In some embodiments, the driver synchronizes with another wall grazer apparatus together to show a light effect.

In some embodiments, when a mobile device sends a calling message to the driver, the driver controls the light source to emit a response light to inform a position of the wall grazer apparatus.

In some embodiments, further includes a distance switch for adjusting a distance between the light source and the lens.

In some embodiments, further includes a rotation switch for adjusting a relative angle between the light source and the lens.

In some embodiments, the light source has multiple sets of LED modules, each set of the LED modules corresponds to a different lens set for producing a different light pattern.

In some embodiments, the multiple sets of LED modules are operable independently to mix a desired effect.

BRIEF DESCRIPTION OF DRAWINGS

FIG. 4 illustrates a component of the embodiment.
FIG. 5 illustrates another component of the embodiment.
FIG. 6 illustrates another component of the embodiment.
FIG. 7 illustrates another component of the embodiment.

DETAILED DESCRIPTION

Figure 16:
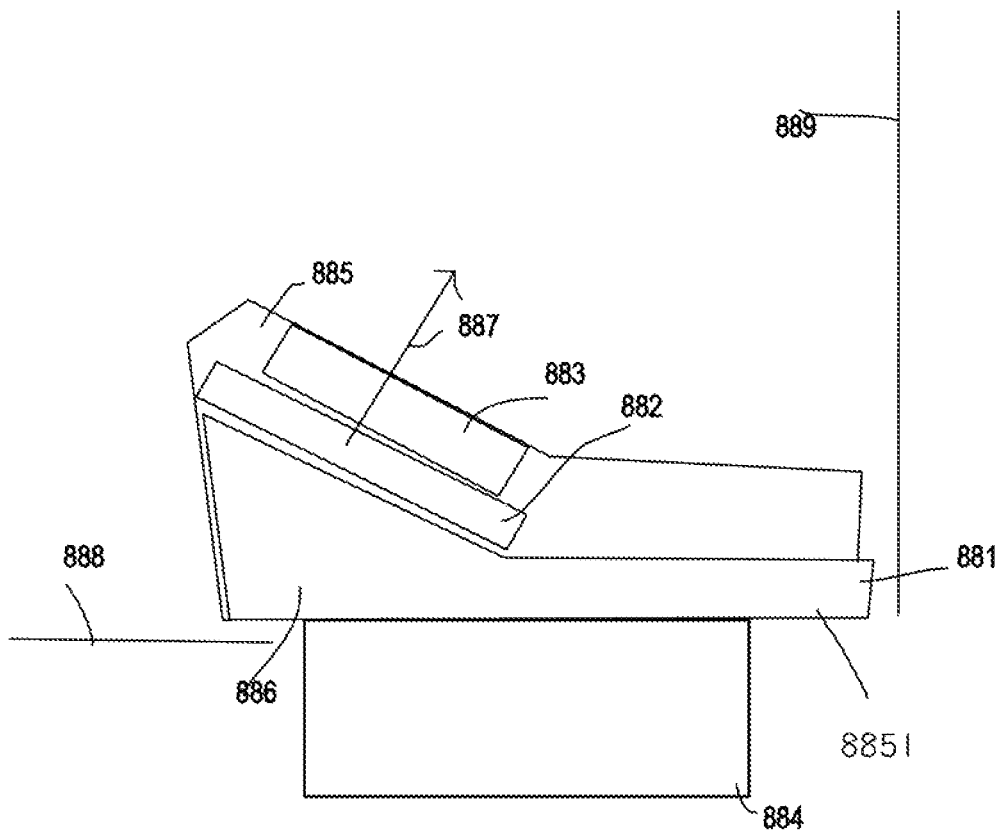
FIG. 16 shows a structure diagram of an embodiment.

In FIG. 16, a wall grazer apparatus is illustrated. The wall grazer apparatus has a heat sink platform 881, a light source 882, a lens 883, a driver 884 and a main housing 885. The heat sink platform 881 has a main portion 8851 and a tilt portion 886. The light source 882 is mounted on the tilt portion 886. The lens 883 is disposed above the light source 882 to convert an original light 887 emitted from the light source 882 to an output light 887. The driver 884 converts an external power to a driving current. The driving current is supplied to the light source 882. The main housing 885 disposes the heat sink platform 881, the light source 882, the lens 883 and the driver 884. When the main housing 885 is fixed to a first surface, 888 the output light is projected on a second surface 889 for forming a visual effect.

In some embodiments, the heat sink platform is a metal plate with a bent portion as a tilt portion. The main portion is parallel to the first surface.

Figure 17A:
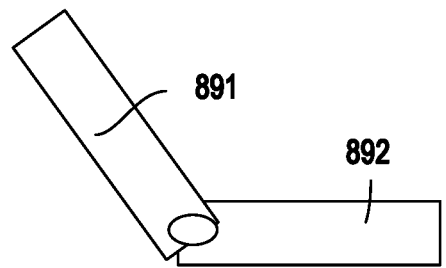
FIG. 17A, FIG. 17B and FIG. 17C show three statuses of a rotatable tilt portion example.
Figure 17B:
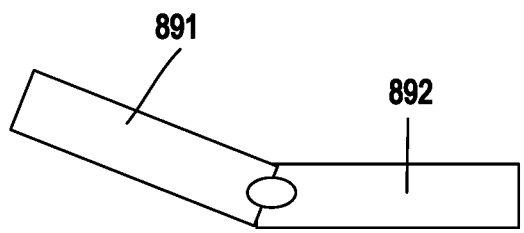
Figure 17C:
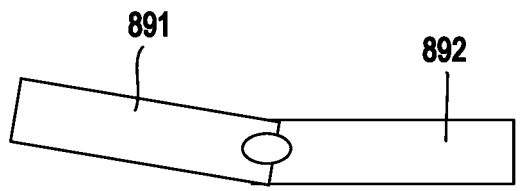

In FIG. 17A, FIG. 17B and FIG. 17C, the tilt portion 891 is manually rotatable with respect to the main portion 892 of the heat sink platform. By rotating the tilt portion 891, an output light angle of the light source is adjusted accordingly. Such design makes it more flexible on providing visual effect appeared on a projected wall.

Figure 18:
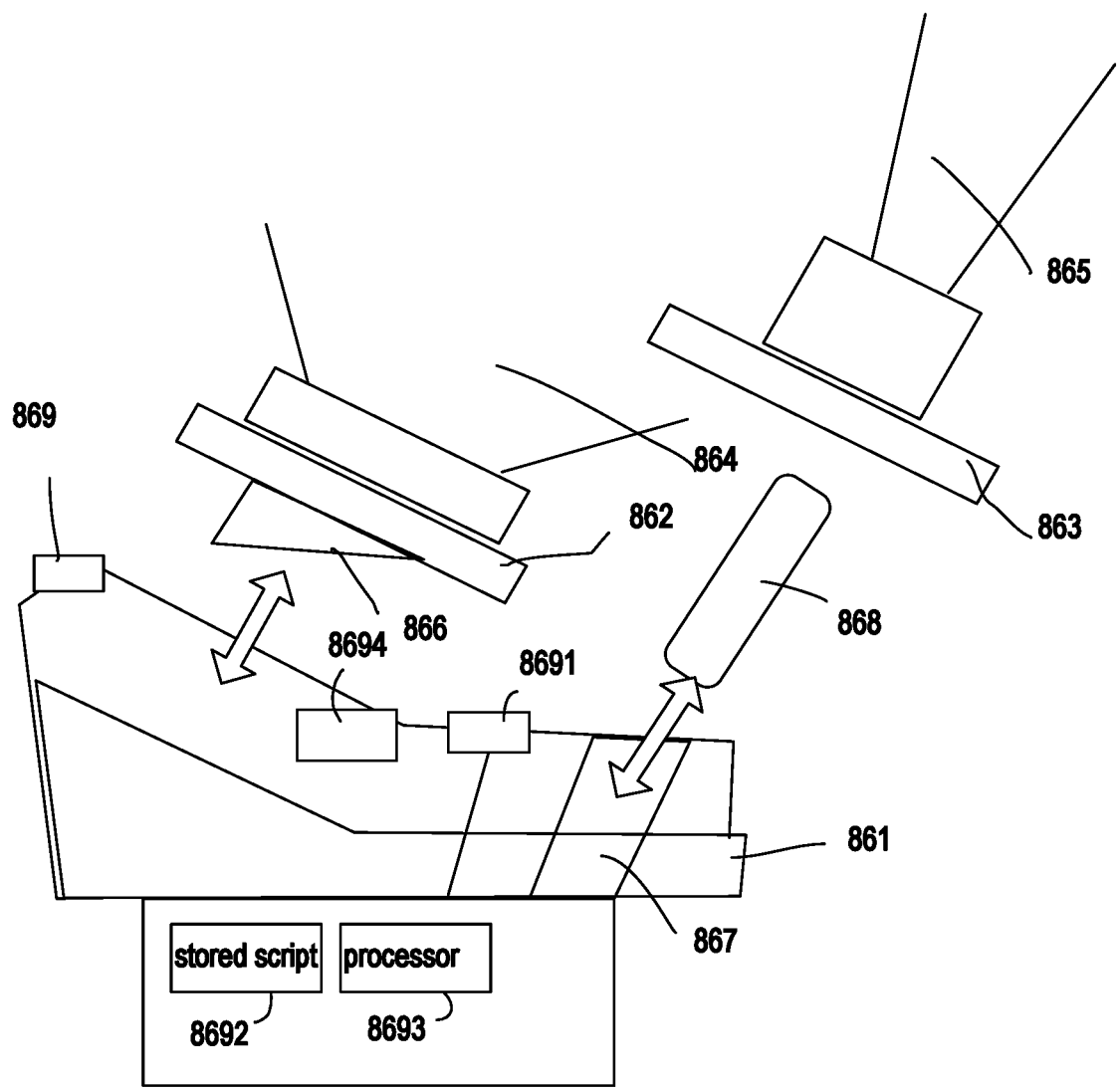
FIG. 18 shows another embodiment.

In FIG. 18, the light source and the lens are formed as a first module 862. The heat sink platform and the driver are formed as a second module 861. The first module 862 is detachably connected to the second module for replacing a different first module 863 with different parameters. The first module 862 may provide a first setting 864 of output light and the second module 863 may provide a second setting 865 of another output light.

In FIG. 18, the first module has a module housing with a tilt block 866 for changing an angle between a light source and a second surface when the first module 862 is attached to the heat sink platform.

In FIG. 18, the wall grazer apparatus has an interface 867. The interface 867 is capable of being plugged in an attached device 868. The attached device 868 may include a wireless module to provide wireless communication ability to the wall grazer apparatus. In some other embodiments, the attached device 868 may be any other function module, e.g. a speaker, a sensor or any circuits for providing a corresponding function.

The interface may be a proprietary interface or a general interface, e.g. a USB interface suitable for connecting various function modules easily and conveniently. For example, a USB battery pack may be inserted to the interface 867 to supply power to the light source.

In FIG. 18, the main housing has a manual switch 869. The manual switch 869 connects to the driver for changing a control setting of the light source. For example, the manual switch 869 may be used to change color, color temperature, light beam angles or any other parameters of the wall grazer apparatus.

In FIG. 18, the driver is connected to a color temperature sensor 8691. The color temperature sensor 8691 is capable of capturing an environment color to let the driver adjust a parameter of the light source to emit a light compensating the environment color to meet predetermined color settings.

In FIG. 18, the driver controls the light source to generate a variation of light based on a stored script 8691 executed by a processor 8693. For example, the processor 8693 may be a microelectronic controller that reads the stored script 8692 from a memory device and executes the stored script 8692 to generate corresponding control signals to change currents of LED chips to mix a desired output light effect.

In FIG. 18, the driver is connected to a wind sensor 8694 to control the light emitted to create a flowing effect. Specifically, when wind blows, the wind sensor 8694 detects the wind and the driver sets a flowing pattern, e.g. variation of luminance level over a time period, in response to the detected wind. Such visual effect is amazing for users who can feel the wind at the moment and see the responding light effect appearing on a projected wall. The wind detector may not need to installed directly on the wall grazer apparatus. Instead, the wind detector may be installed on a position closer to users who are close to the projected wall.

Figure 20:
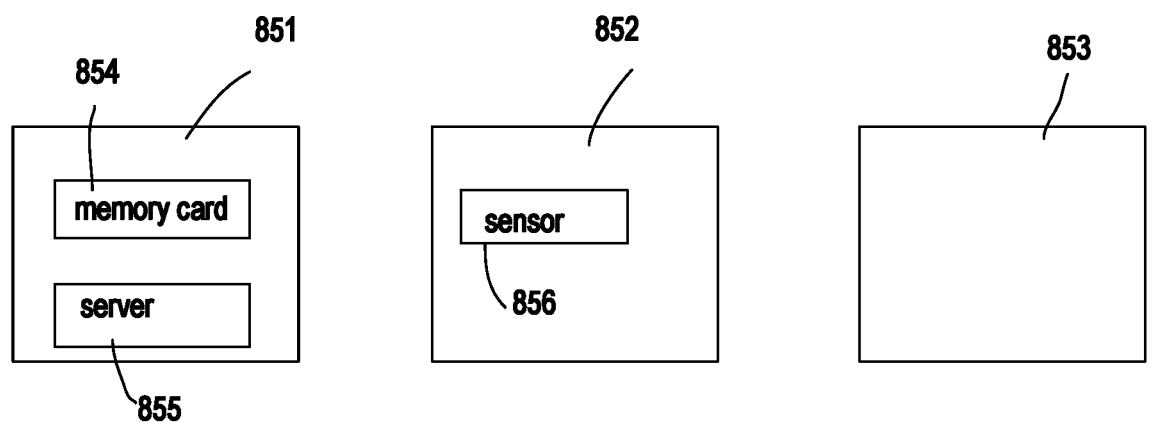
FIG. 20 shows a interaction among wall grazer apparatuses.

In FIG. 20, the driver controls a switch of the light source in a first wall grazer apparatus 851 by co-working with a second wall grazer apparatus 852 to cool down periodically. Specifically, the first wall grazer 851 is turned on for one hour and then the second wall grazer 852 is turned on for the next one hour, in which the first wall grazer 851 is turned off to cool down. The projected area of the first wall grazer apparatus 851 and the second wall grazer apparatus 852 may be overlapped to show similar visual effect for both the first wall grazer apparatus 851 or the second wall grazer apparatus 852.

In FIG. 20, a memory card 854 is detachably connected to the driver for providing a schema. The driver is capable of controlling the light source by the schema.

In FIG. 20, the driver of the first wall grazer 851 shares the schema to the second wall grazer apparatus 852. Usually, there are many wall grazer apparatuses deployed in a scene, e.g. a park or a museum. Users only need to record the schedule and control commands or settings in a memory card, place the memory card to the first wall grazer apparatus 851. The first wall grazer apparatus 851 communicates with the second wall grazer apparatus 852 and the third wall grazer apparatus 853 to share the settings so as to function together for providing necessary visual effect.

In FIG. 20, the driver has a server 855. The server 855 is capable of providing wireless access to another wall grazer apparatus 852 or 853 for sharing control data. Users may also transmit or edit the control data by a remote device, e.g. a mobile phone or a computer with a browser, if the server 855 is an HTTP server.

In FIG. 20, the driver synchronizes with another wall grazer apparatus to show a light effect. For example, the second wall grazer apparatus has a sensor 856 to detect the synchronization pattern, e.g. turn-on for 0.1 second, turn-off for 0.2 second and turn-on for 0.2 second, to acknowledge the synchronization signal to work together with the first wall grazer apparatus.

In some embodiments, the driver controls the light source to emit a response light when a mobile device sends a calling message. For example, the mobile phone may sends a signal to activate a stored procedure of the wall grazer apparatus to function accordingly to show a specific pattern of visual effect.

Figure 21A:
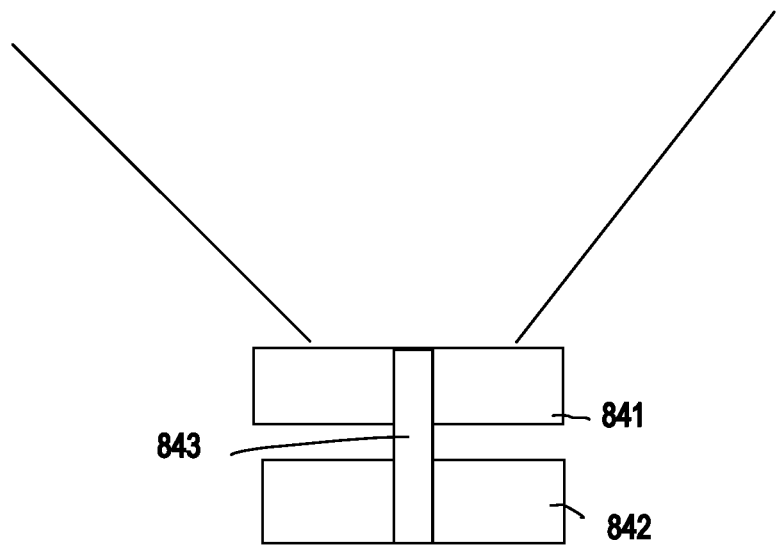
FIG. 21A and FIG. 21B show a wall grazer apparatus with a manual switch.
Figure 21B:
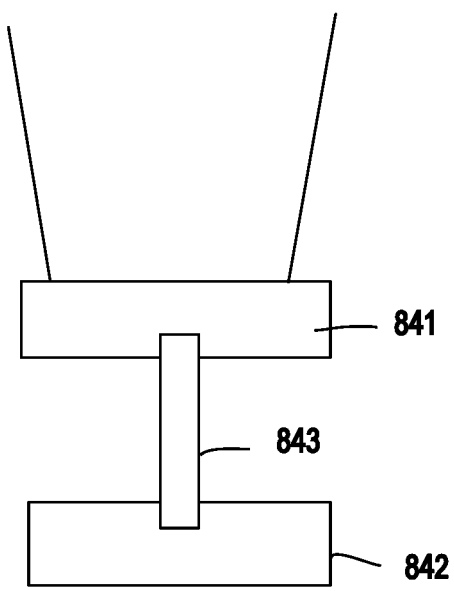

In FIG. 21A and FIG. 21B, the wall grazer apparatus has a distance switch 843. The distance switch 843 is capable of adjusting a distance between the light source 842 and the lens 841. FIG. 21A and FIG. 21B show different distance between the lens 8411 and the light source 842 to adjust a light beam angle.

In some embodiments, the wall grazer apparatus has a rotation switch. The rotation switch is capable of adjusting an angle between the light source and the lens. FIG. 21A and the FIG. 21B may be used as reference such concept when the switch 843 is changed to a rotating switch.

Figure 19:
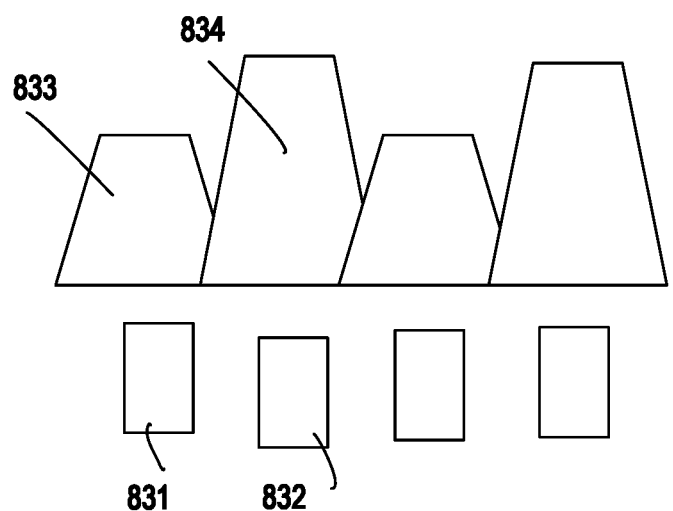
FIG. 19 shows different lens are used for different LED chips.

In FIG. 19, the light source has multiple sets of LED modules 831, 832. Each set of the LED modules corresponds to a different lens set for producing a different light pattern. For example, the LED module 831 correspond to a first type of lens 833. Another LED module 832, which has different parameters as the LED module 831, is corresponding to a different type of lens 834.

In some embodiments, the multiple sets of LED modules are operable independently to mix a desired effect.

Four embodiments are provided below for more detailed explanation of the concept of these embodiments.

First Embodiment

Please refer to FIG. 1 to FIG. 15. A wall grazer apparatus is provided. The wall grazer apparatus adopts circular design. The wall grazer apparatus has a housing 1, lens 9, a light source 8, a driver 5 and a base structure. The base structure has a heat sink platform 7, an installation plate 3. The heat sink platform 7 has a tilt portion 71. The light source 8 is fixed on the tilt portion 71. The light source 8 has a positioning hole. The lens 9 is set on the side having LED light source of the light source 8. Please refer to FIG. 4. The lens 9 adopts transparent or translucent plastic materials as a unibody structure. The lens 9 has an elongated groove 91. The groove 91 is protruding from edge extending upward to form a positioning protruding platform 92. The positioning protruding platform 92 connects with the positioning hole to let the light source 8 assemble on the lens and fix with the housing 1 with a fastener. A light output surface of the light source 8 is in the groove 91. The bottom of the groove 91 protrudes toward the direction of the light source 8 to form a curve surface to let the light source go through optical processing by the lens 9 and have refraction. The light emitted is more well-distributed and has no overlapping shadow. An illuminating surface of the lens 9 is bow shape. A protruding buckle bar 93 is near a rim of the illuminating surface of the lens 9 to fix the lens 9 and the housing 1.

The housing 1 is fixed with the base structure with a fastener. A waterproof foam 21 is stuffed between the base structure and the housing 1 to guarantee a waterproof sealing. The housing 1 has an illuminating surface 11 and an installation surface 12. The illuminating surface 11 has a window 13 corresponding with the lens 9. The illuminating surface of the lens 9 embeds window 13. The protruding buckle bar 93 positions the lens 9 to guarantee the illuminating surface of the lens 9 is in parallel with the illuminating surface 11. The installation surface 12 is in parallel with the base structure. The angle between the illuminating surface 11 and the installation surface 12 is 90~160° to guarantee the light emitted on the wall has no shadow and dark area, and further increase the quality of the light and the application of the product.

Figure 1:
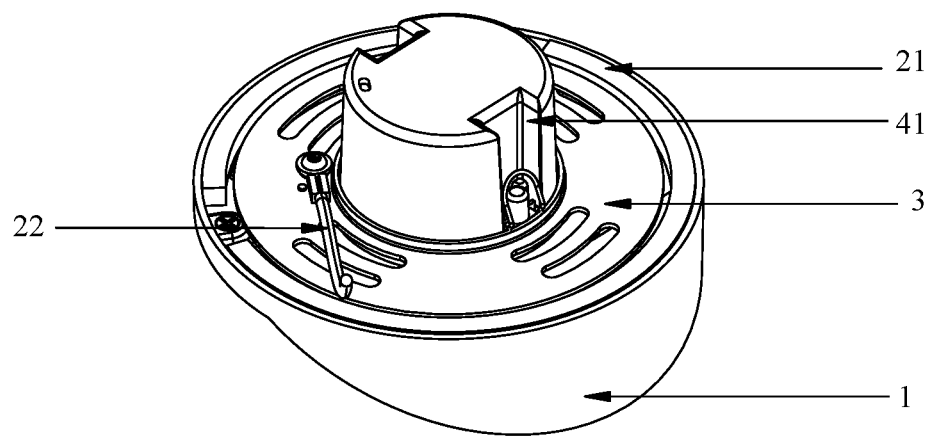
FIG. 1 illustrates a wall grazer apparatus.
Figure 2:
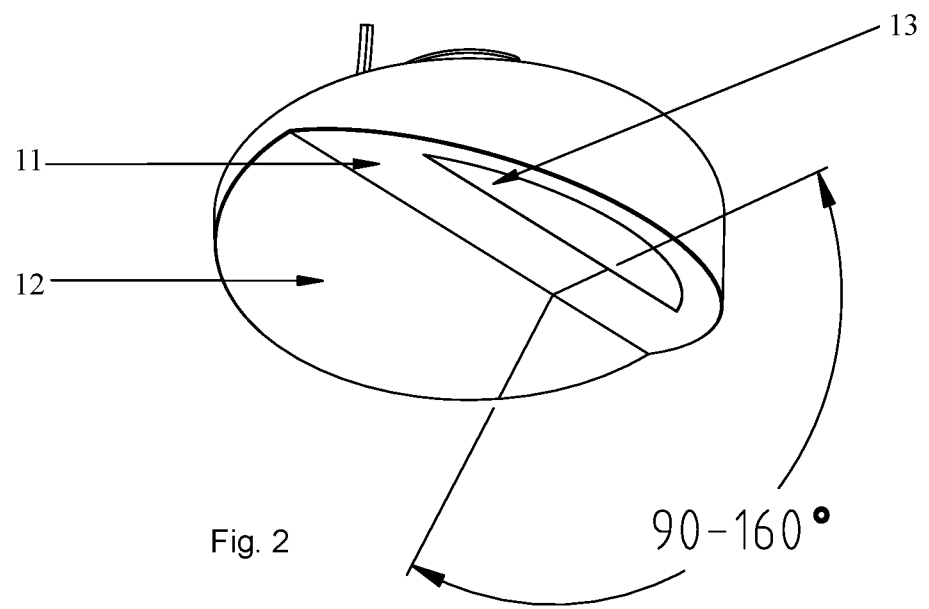
FIG. 2 illustrates another view of the wall grazer apparatus.
Figure 3:
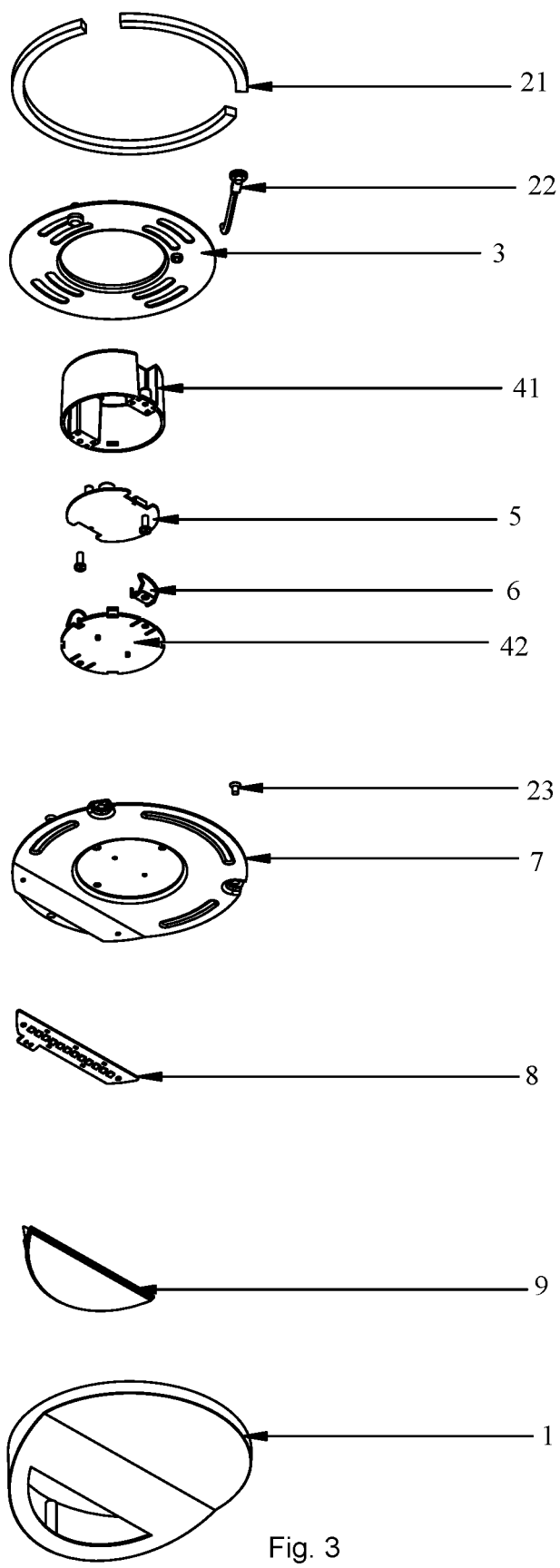
FIG. 3 illustrates an exploded view of the wall grazer apparatus.
Figure 8:
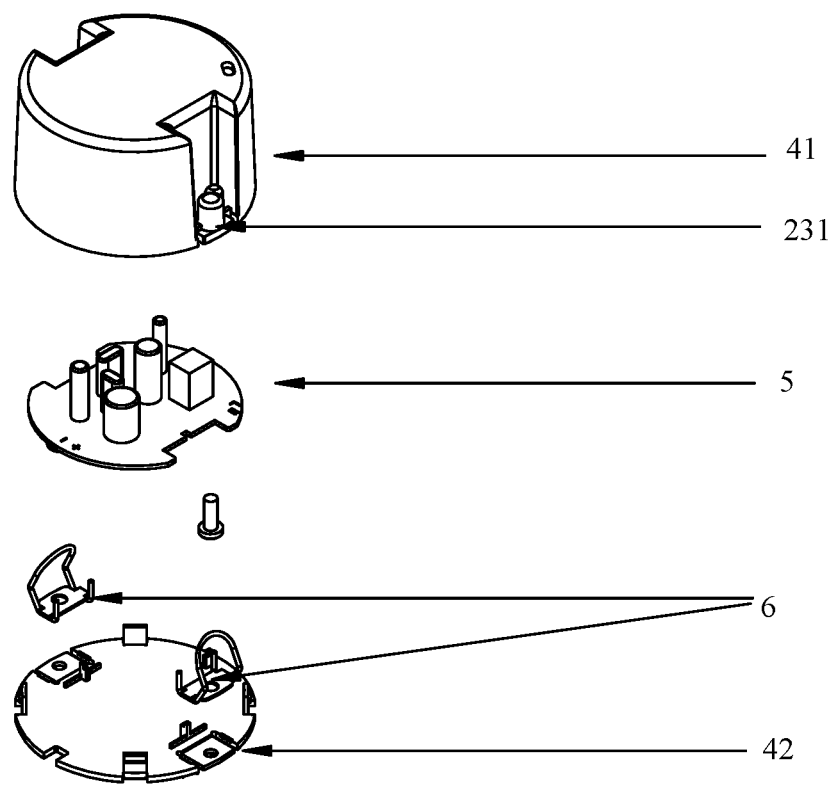
FIG. 8 illustrates an exploded view of a driver.
Figure 9:
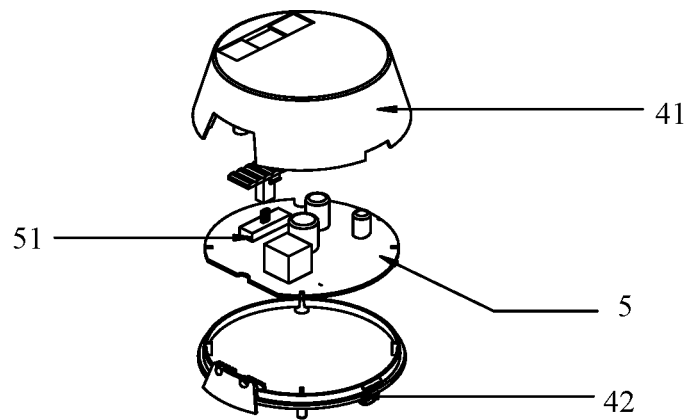
FIG. 9 illustrates another exploded view of a driver.
Figure 10:
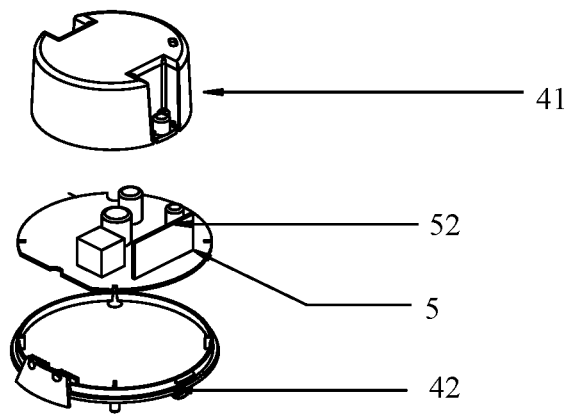
FIG. 10 illustrates another exploded view of a driver.
Figure 11:
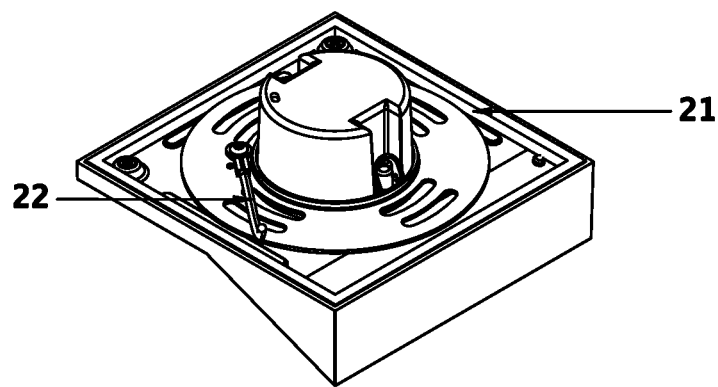
FIG. 11 shows another view of the example.
Figure 12:
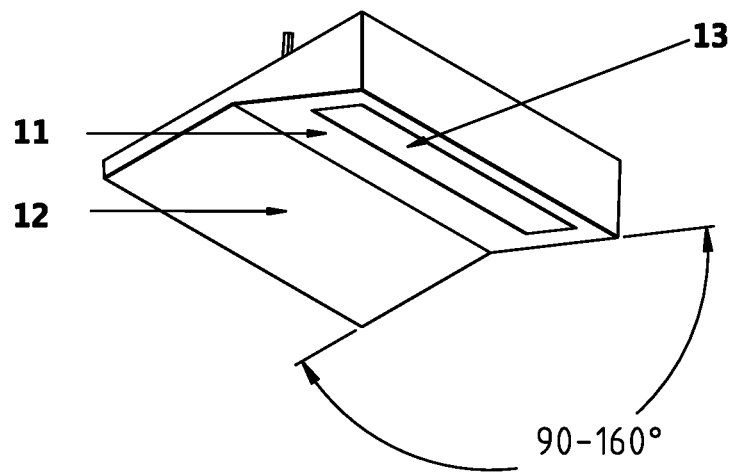
FIG. 12 shows another view of the example.
Figure 13:
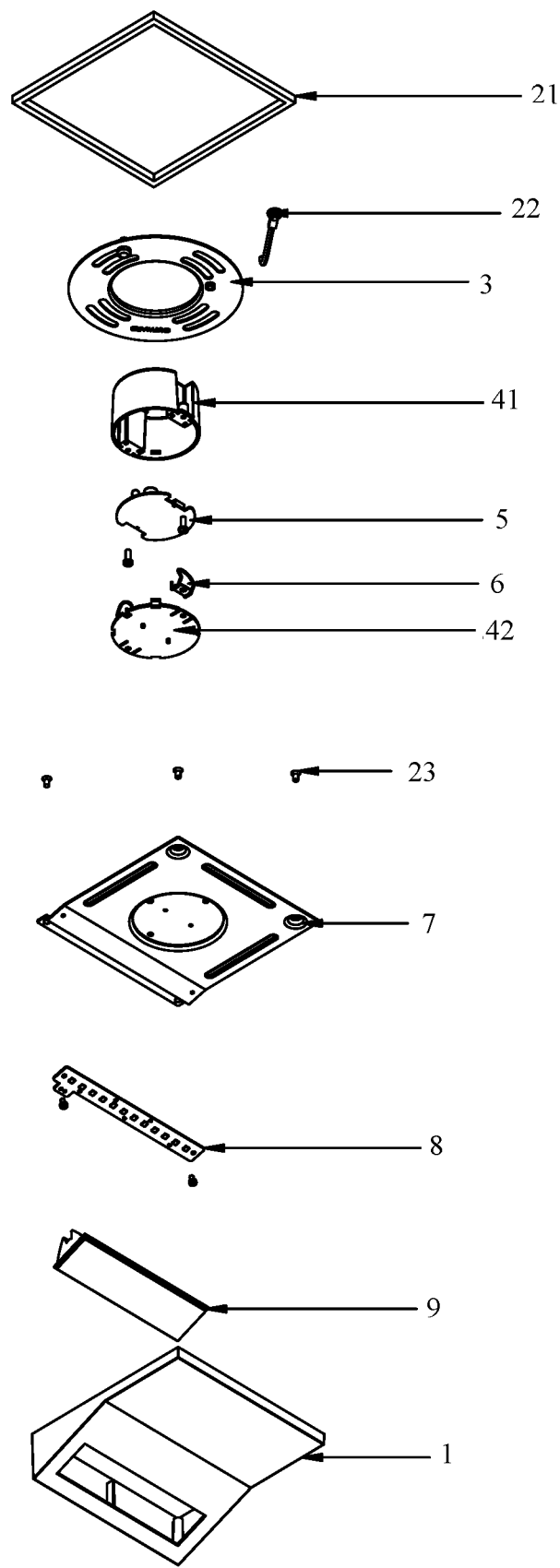
FIG. 13 shows another embodiment in an exploded view.
Figure 14:
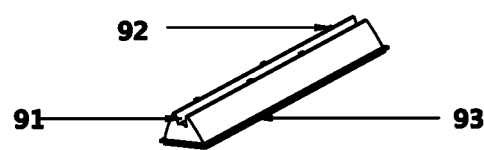
FIG. 14 shows another example.
Figure 15:
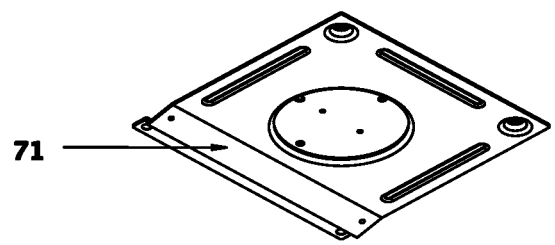
FIG. 15 shows a component in the embodiment.

Please refer to FIG. 8. A driver 5 is between a driver top cover 41 and a driver bottom cover 42. A side of the driver bottom cover 42 is set on the top surface of a heat sink platform 7. The other side of the driver bottom cover 42 is fixed with the driver 5. The driver top cover 41 is buckled with the driver bottom cover 42 from the direction of the driver 5. The driver top cover 41 and the driver bottom cover 42 are fixed on the top surface of the heat sink platform 7 by a fastener. A fixing spring 6 is fixed on the both side of the driver top cover 41 by the fastener.

The installation plate 3 has a hole to connect with a grounding wire 22. The installation plate 3 has an opening part 31. The opening part 31 is set on the rim of the driver top cover 41. The installation plate 3 extrudes the fixing spring 6 to let the fixing spring 6 be elastic. The installation plate 3 connects with the fixing spring 6 and attaches with the heat sink platform 7. The installation plate 3 has multiple sets of U-shaped installation hole to fit different open hole. The fixing spring 6 has a fixing portion and an elastic clip portion. The fixing portion is locked with the driver bottom cover 42. The elastic clip portion extends from the fixing portion to the rim of the driver top cover 41. Both ends of the elastic clip is near the driver top cover 41 while the middle part protrudes against the direction of the center of the driver top cover 41. The fixing spring 6 has a screw on the fixing portion. The driver bottom cover 42 has a screw on the corresponding place. A window of the driver top cover 41 has a screw base 231 having a hole downward.

In this embodiment, the driver top cover 41 is a cylinder while the driver bottom cover 42 is a matching circular. The opening part 31 is a matching circular to the driver top cover 41. A side wall of the driver top cover 41 caves in inwards to form an opening groove 43. The elastic clip portion is on the protruding part of the opening groove 43 extending to the side wall of the driver top cover 41.

The following procedures illustrate how to install an embodiment.

Step One. A light source 8 is fixed on the tilt portion 71 of the heat sink platform 7 by a screw 23.

Step Two. A driver bottom 42 is fixed on the surface of the heat sink platform 7 to weld a power line of a driver 5 to corresponding positive and negative terminals of the light source 8. A fixing spring 6 is fixed with the driver bottom cover 42 and a driver top cover 41.

Step Three. A lens 9 is placed in a corresponding positioning hole of the light source 8.

Step Four. A housing 1 is correspondingly buckled with the heat sink platform 7 by the screw 23.

Step Five. An opening part 31 of an installation plate 3 passes through the driver top cover 41 to joint to the direction of the heat sink 7. A side wall of the opening part 31 extrudes the fixing spring 6 to let the fixing spring 6 be in the opening part 31. When the installation plate 3 moves downwards, the fixing spring 6 resets, and the installation plate 3 attaches with the heat sink platform 7.

Step Six. Seal by waterproof foam 21.

Second Embodiment

The differences between the first embodiment and the second embodiment is as follows.

A driver 5 has a driver board. Both ends of the driver board has windows to let the screw 23 pass through. The driver board has a potentiometer or a switch. A light source 8 adopts at least two light sources and abandons single lighting mode. An apparatus provided is capable of switching at least two color temperatures by control device 51 such as manual switch, digital switch and TRIAC switch to enable discrete switch or continuous switch.

Third Embodiment

The difference between the third embodiment and the second embodiment is as follows.

A driver 5 has an AI smart card circuit 52 to switch color temperature by remote control or cellphone application and to control the power to enable light adjustment.

Fourth Embodiment

The difference between the fourth embodiment and the first embodiment is as follows.

This embodiment adopts a rectangular housing 1. A heat sink platform 7 is a square. Multiple of appearances is provided to fit different installation needs. A lens 9 is elongated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A wall grazer apparatus, comprising:
 a heat sink platform having a main portion and a tilt portion;

a light source mounted on the tilt portion;

a lens disposed above the light source for converting an original light emitted from the light source to an output light;

a driver for converting an external power to a driving current supplied to the light source; and a main housing for disposing the heat sink platform, the light source, the lens and the driver, when the main housing being fixed to a first surface, the output light being projected on a second surface for forming a visual effect, wherein the light source and the lens form a first module, the heat sink platform and the driver are formed as a second module, the first module is detachably connected to the second module for replacing a different first module with different parameters.

2. The wall grazer apparatus of claim 1, wherein the heat sink platform is a metal plate with a bent portion as the tilt portion, the main portion is parallel to the first surface.

3. The wall grazer apparatus of claim 1, wherein the tilt portion is manually rotatable with respect to the main portion of the heat sink platform.

4. The wall grazer apparatus of claim 1, wherein the first module has a module housing with a tilt block for changing a final tilt angle of the light source with respect to the second surface when the first module is attached to the heat sink platform.

5. The wall grazer apparatus of claim 1, further comprising an interface for plugging an attached device.

6. The wall grazer apparatus of claim 1, wherein the main housing has a manual switch connected to the driver for changing a control setting of the light source.

7. The wall grazer apparatus of claim 1, wherein the driver is connected to a color temperature sensor for capturing an environment color temperature to adjust colors of the output light of the light source.

8. The wall grazer apparatus of claim 1, wherein the driver controls the light source to generate a variation of the output light over time based on a stored script.

9. The wall grazer apparatus of claim 1, wherein the driver is connected to a wind sensor for controlling the output light to create a flowing effect according to a detected wind.

10. The wall grazer apparatus of claim 1, wherein the driver contols the light source to start and stop the light source emitting the output light by co-working with another neighboring wall grazer apparatus to cool down periodically.

11. The wall grazer apparatus of claim 1, wherein a memory card is detachably connected to the driver for providing a schema for controlling the light source.

12. The wall grazer apparatus of claim 11, wherein the driver shares data of the scheme to another wall grazer apparatus.

13. The wall grazer apparatus of claim 11, wherein the driver contains a server for providing wireless access to another wall grazer apparatus for sharing control data.

14. The wall grazer apparatus of claim 1, wherein the driver synchronizes with another wall grazer apparatus together to show a light effect.

15. The wall grazer apparatus of claim 1, wherein when a mobile device sends a calling message to the driver, the driver controls the light source to emit a response light to inform a position of the wall grazer apparatus.

16. The wall grazer apparatus of claim 1, further comprises a distance switch for adjusting a distance between the light source and the lens.

17. The wall grazer apparatus of claim 1, further comprises a rotation switch for adjusting a relative angle between the light source and the lens.

18. The wall grazer apparatus of claim 1, wherein the light source has multiple sets of LED modules, each set of the LED modules corresponds to a different lens set for producing a different light pattern.

19. The wall grazer apparatus of claim 18, wherein the multiple sets of LED modules are operable independently to mix a desired effect.

* * * * *